(12) United States Patent
Xu et al.

(10) Patent No.: US 11,089,545 B1
(45) Date of Patent: Aug. 10, 2021

(54) SYSTEM AND METHOD FOR LOW POWER DATA TRANSMISSION AND CONTROL

(71) Applicant: YoSmart, INC, Irvine, CA (US)

(72) Inventors: Manxiang Xu, Irvine, CA (US); Weilong Zuo, Shenzhen (CN); Duojian Wu, Shenzhen (CN)

( * ) Notice: Subject to any disclaimer, the term of this patent is extended or adjusted under 35 U.S.C. 154(b) by 0 days.

(21) Appl. No.: 16/823,020

(22) Filed: Mar. 18, 2020

(51) Int. Cl.
H04W 52/46 (2009.01)
H04W 52/02 (2009.01)
H04W 72/04 (2009.01)
H04W 72/00 (2009.01)
H04L 5/00 (2006.01)

(52) U.S. Cl.
CPC ....... H04W 52/0216 (2013.01); H04L 5/0055 (2013.01); H04W 52/0229 (2013.01); H04W 72/005 (2013.01); H04W 72/0446 (2013.01)

(58) Field of Classification Search
CPC ............. H04W 52/46; H04W 52/0216; H04W 52/0229; H04B 7/18543; H02W 72/0005; H04L 5/0055
See application file for complete search history.

(56) References Cited

U.S. PATENT DOCUMENTS

| | | | |
|---|---|---|---|
| 6,965,542 B1 * | 11/2005 | Harrington | F41A 33/00 367/127 |
| 9,936,069 B2 * | 4/2018 | Silver | H04M 3/436 |
| 10,050,740 B2 * | 8/2018 | Zhang | H04J 14/0271 |
| 10,506,102 B2 * | 12/2019 | Juvet | H04M 3/42221 |
| 2003/0081219 A1 * | 5/2003 | Bennett | G01C 19/72 356/460 |
| 2004/0145464 A1 * | 7/2004 | Linger | G01R 31/52 340/512 |
| 2006/0279417 A1 * | 12/2006 | Linger | G01R 31/50 340/508 |
| 2008/0140976 A1 * | 6/2008 | Holt | G06F 9/52 711/168 |
| 2009/0122775 A1 * | 5/2009 | Haartsen | H04L 5/0005 370/338 |
| 2017/0070611 A1 * | 3/2017 | Silver | H04M 3/02 |
| 2017/0111123 A1 * | 4/2017 | Ouzounov | H04L 67/12 |
| 2018/0092039 A1 * | 3/2018 | Cariou | H04W 52/34 |
| 2018/0115952 A1 * | 4/2018 | Shellhammer | H04L 43/0829 |
| 2018/0220380 A1 * | 8/2018 | Croux | H04L 5/0055 |
| 2018/0313996 A1 * | 11/2018 | Kuchinsky | G02B 6/0023 |

(Continued)

Primary Examiner — Hassan A Phillips
Assistant Examiner — Prenell P Jones
(74) Attorney, Agent, or Firm — Feng Qian

(57) ABSTRACT

Present disclosure describes a method for low power communication between smart devices, including data transmission and control. The method for communicating with a smart device, includes following steps: waking up from a sleep mode periodically; performing an incoming transmission signal detection at a first frequency after waking up from the sleep mode; determining if an incoming transmission signal is detected; determining if at least part of a wake message is received, based on the determination that the incoming transmission signal is detected; determining if the at least part of the wake message is associated with the device, based on the determination that the at least part of the wake message is received; and switching to a second frequency for communication, based on the determination that the at least part of the wake message is associated with the device.

10 Claims, 13 Drawing Sheets

(56) References Cited

U.S. PATENT DOCUMENTS

| | | | | |
|---|---|---|---|---|
| 2018/0367236 A1* | 12/2018 | Zhang | ............... | H04J 14/0257 |
| 2019/0028968 A1* | 1/2019 | Ma | ................ | H04L 25/03006 |
| 2019/0159127 A1* | 5/2019 | Son | ................ | H04W 52/0216 |
| 2019/0297577 A1* | 9/2019 | Lin | ................ | H04W 52/0216 |
| 2019/0306313 A1* | 10/2019 | Juvet | .................. | H04L 69/22 |
| 2019/0306811 A1* | 10/2019 | Balakrishnan | .... | H04W 52/0261 |
| 2020/0112919 A1* | 4/2020 | Nam | ................ | H04W 24/08 |
| 2020/0137686 A1* | 4/2020 | Cao | ................... | H04L 1/0008 |

* cited by examiner

SYSTEM AND METHOD FOR LOW POWER DATA TRANSMISSION AND CONTROL

TECHNICAL FIELD

The present description relates generally to a system and method for low power data transmission and control, and in particular to system and method for low power data transmission and control in a low-power wide-area network.

BACKGROUND

The Internet of Things (IoT) may bring Internet connectivity to as many as 50 billion devices by 2020. For organizations, IoT devices may provide opportunities for monitoring, tracking, or controlling other devices and items, including further IoT devices, other home and industrial devices, items in manufacturing and food production chains, and the like.

Traditional fields of embedded systems, wireless sensor networks, control systems, automation (including home and building automation), and others all contribute to enabling the Internet of things. In the consumer market, IoT technology is most synonymous with products pertaining to the concept of the "smart home", covering devices and appliances (e.g., lighting fixtures, thermostats, home security systems and cameras, and other home appliances) that support one or more common ecosystems, and can be controlled via devices associated with that ecosystem, such as smartphones and smart speakers.

Wireless communication technologies such as Wi-Fi or Bluetooth technology may require high power for devices even in a standby mode and the communication distance is short. Thus, Wi-Fi or Bluetooth technology may not be suitable for devices with one or more batteries and/or sensors.

ZigBee is an IEEE 802.15.4-based specification for a suite of high-level communication protocols used to create personal area networks with small, low-power digital radios, such as for home automation, medical device data collection, and other low-power low-bandwidth needs, designed for small scale projects which need wireless connection. Hence, ZigBee is a low-power, low data rate, and close proximity (i.e., personal area) wireless ad hoc network. The communication protocols associated with ZigBee may be complex. ZigBee devices may transmit data over long distances by passing data through a mesh network of intermediate devices to reach more distant ones. Thus, the reliability of ZigBee technology may be low. Also, Zigbee technology may not support mutual control between the smart devices, and may only support data transmission between the smart devices.

A low-power wide-area network is a type of wireless telecommunication wide area network designed to allow long-range communications at a low bit rate among things, such as sensors operated on a battery. Low-power wide-area networks are attracting extensive attention because of their abilities to offer low-cost and massive connectivity to smart devices distributed over wide geographical areas. Low-power wide-area technologies are becoming a promising alternative to support sustainable IoT due to its capability to offer better trade-offs among power consumption, coverage, data rate, and cost. LPWA technologies have the potential to make a significant contribution to IoT ecosystems due to its unique features of long transmission range and low power consumption. Currently competing candidates of LPWA networks include narrowband IoT (NB-IoT) and long range (LoRa). LoRa wide-area network technology includes features of a long communication range, low power consumption, one or more star networks and easy installation and better stability.

Thus, this is a need for a low-power wide-area network, such as a LoRa wide-area network to facilitate a low power data transmission and control for smart devices.

SUMMARY

Present disclosure describes a method for low power communication between smart devices, including data transmission and control. The method for communicating with a smart device, includes following steps: waking up from a sleep mode periodically; performing an incoming transmission signal detection at a first frequency after waking up from the sleep mode; determining if an incoming transmission signal is detected; determining if at least part of a wake message is received, based on the determination that the incoming transmission signal is detected; determining if the at least part of the wake message is associated with the device, based on the determination that the at least part of the wake message is received; and switching to a second frequency for communication, based on the determination that the at least part of the wake message is associated with the device.

In one embodiment, at the step of determining if an incoming transmission signal is detected, the method also includes a step of performing a channel activity detection.

In one embodiment, the method further comprises a step of sending a timeout signal to indicate that the no incoming transmission signal is received, based on the determination that no incoming transmission signal is received.

In one embodiment, the method further comprises a step of determining if an incoming transmission signal is detected again based on the determination that no incoming transmission signal is received.

In one embodiment, at least part of the wake message includes a sub-sequence in the wake message.

In one embodiment, the method further comprises a step of receiving a control message after switching to the second frequency for communication.

In one embodiment, the method further comprises a step of sending an acknowledgment message to acknowledge that the control message is received.

In one embodiment, the method further comprises a step of configuring to be in a sleep mode, based on the determination that the incoming transmission signal is not detected.

In one embodiment, the method further comprises a step of configuring to be in a sleep mode, based on the determination that the at least part of the wake message is not received.

In one embodiment, the method further comprises a step of configuring to be in a sleep mode, based on the determination that the at least part of the wake message is not associated with the device.

In one embodiment, the method further comprises a step of waking up after the sleep mode.

Present disclosure also describes a system for low power communication between smart devices, including data transmission and control. The system includes a sensor device or an actuator device, at least one processor circuit that is configured to: wake up from a sleep mode periodically; perform an incoming transmission signal detection at a first frequency after waking up from the sleep mode; determine if an incoming transmission signal is detected; determine if at least part of a wake message is received, based on the determination that the incoming transmission signal is detected; determine if the at least part of the wake message is associated with the system, based on the determination that the at least part of the wake message is received; and switch to a second frequency for communication, based on the determination that the at least part of the wake message is associated with the system.

Present disclosure also describes a system comprises at least one processor circuit that is configured to: broadcast a first pairing message; receive a second pairing message from a device, after broadcasting the first pairing message; search a file to set a configuration frame for configuring the device; send the configuration frame to the device; receive a response frame indicating the device saving the information in associated with the configuration frame; save information in association with the device, upon receiving the response frame; and determine the device is paired.

In one embodiment, the second system also comprises at least one processor circuit that is further configured to receive an indication for pairing.

In one embodiment, the second system also comprises at least one processor circuit that is further configured to save information in association with the device, upon receiving the response frame, in a table.

In one embodiment, the second system also comprises at least one processor circuit that is further configured to receive information, from the device, associated with a change in a device status of the device, after the determining the device is paired.

Present disclosure also describes a system comprises at least one processor circuit that is configured to: send a wake message, wherein the wake message is associated with a paired device; broadcast a control message; search, according to a stored table, for the paired device associated with the wake message; send a first control frame to the paired device and define a first number of a first time-slot associated with the first control frame; send a second control frame to the paired device and define a second number of a second time-slot associated with the second control frame as a second number upon determining a first time-out; send a third control frame the paired device and define a third number of a third time-slot associated with the control frame as a third number upon determining a second time-out; and define a width of the first time-slot, the second time-slot and the third time-slot.

In one embodiment, the third system also comprises at least one processor circuit that is further configured to send the wake message by pressing a button on the system.

In one embodiment, the button in the third system is associated with a pairing information stored in the system.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
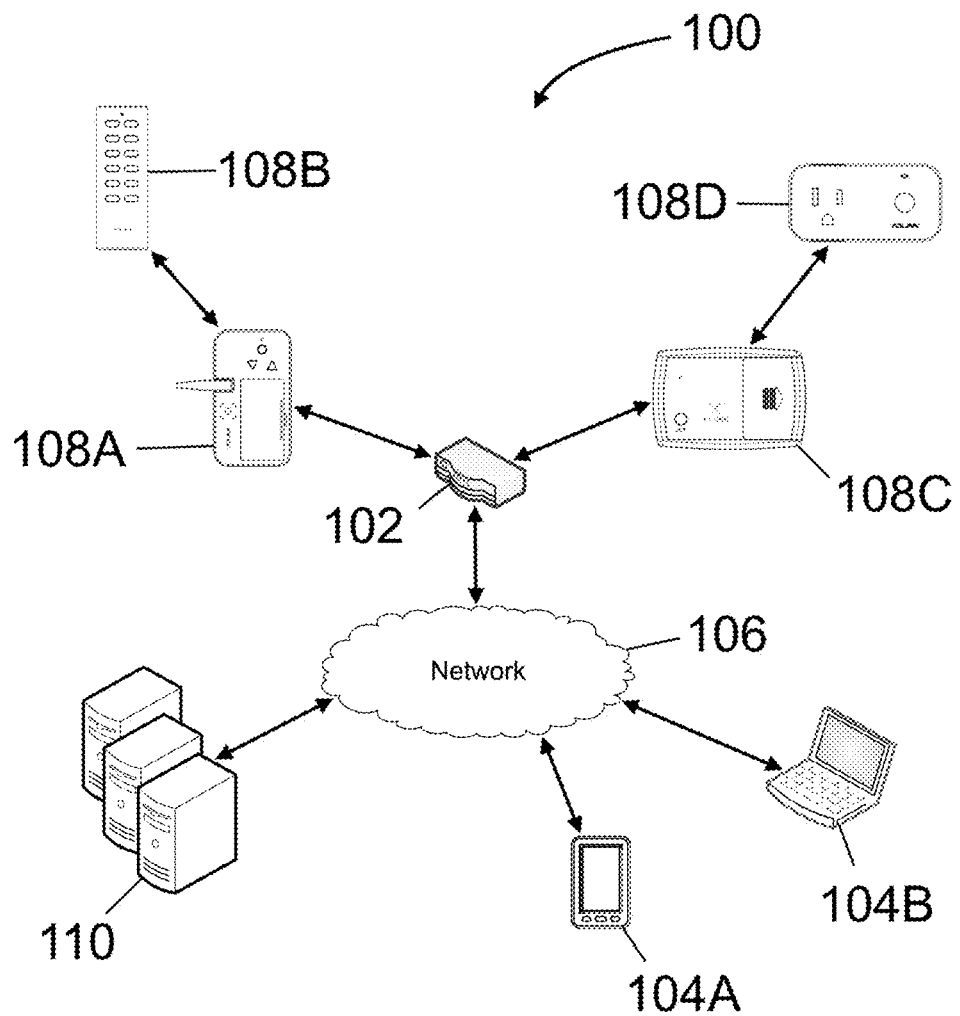
FIG. 1 illustrates an example network environment 100 that may implement a system of low power data transmission and control in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

As described above, IoT technology is most synonymous with products pertaining to the concept of the "smart home", covering devices and appliances (e.g., lighting fixtures, thermostats, home security systems and cameras, and other home appliances) that support one or more common ecosystems, and can be controlled via devices associated with that ecosystem, such as smartphones and smart speakers. Low power data transmission and control for one or more smart devices is presented in the present disclosure. Also, a low-power wide-area network, such as a LoRa wide-area network to facilitate a low power data transmission and control for smart devices is presented.

In one example, one or more smart devices may include one or more smart garage door controllers and one or more smart remote controls. The traditional garage door controller on the market includes a button to control the switch with an electric wire connection, which is not only inconvenient to use, but also has a potential safety hazard. The smart garage door controller in the present disclosure is a wireless garage door controller that uses battery power, with a built-in motor, and can be easily attached to one or more surfaces. The smart garage door controller may replace the finger of a person to operate a traditional garage door controller.

In the present disclosure, the one or more smart devices, such as the smart garage door controller may be awoken and controlled by a gateway or other devices. A wake sequence with a fixed format and length may be sent periodically within a time slot (e.g., 1.1 s) by the gateway or other devices. The smart garage door controller may be awoken periodically with a time interval of 1 s, to initiate a channel activity detect (CAD) signal to check for a wake sequence at a wake frequency. When the wake sequence received is determined to be a wake sequence associated with the smart garage door controller, the smart garage door controller may be awoken to wait for the control sequence. When the wake sequence received is determined to be not a wake sequence associated with the smart garage door controller, the smart garage door controller may sleep.

In the present disclosure, the smart garage door controller may be used in a two-way communication with a user computing device, a server, and/or a gateway. Alternatively, or in addition, the smart garage door controller may be used with other devices, such as including a remote control using a mutual control technology without communicating with a cloud and/or a server and a gateway. In one example, data transmission associated with the smart garage door controller may be encrypted data transmission.

FIG. 1 illustrates an example network environment 100 that may implement a system of low power data transmission and control in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The network environment 100 includes a gateway 102, one or more electronic devices 104A-B, a network 106, one or more smart devices 108A-D, and a server 110.

The gateway 102 may be a central hub, a central controller, or other devices to allow devices within the local network to send and receive data over the Internet.

The one or more electronic devices 104A-B can be computing devices such as smartphones, PDAs, laptop or desktop computers, tablet computers, televisions or other displays with one or more processors coupled thereto or embedded therein.

The network 106 may include, and/or may be communicatively coupled to, one or more of the Internet, a private network, a wearable devices network, an internet of things network, low-power wide-area network, LoRa wide-area network or other networks. The network 106 may include one or more wired or wireless network devices that facilitate device communications of the gateway 102, the computing devices 104A-B, and/or the server 110, such as including switch devices, router devices, relay devices, etc., and/or may include one or more servers. In one or more implementations, the gateway 102 may establish a direct network connection, e.g. via Bluetooth, Wi-Fi, etc., with one or more of the computing devices 104A-B, and/or the server 110, without communicating through the network 106.

The smart device 108A is depicted in FIG. 1 as a smart garage door controller. The smart device 108B is depicted in FIG. 1 as a smart remote control. The smart device 108C is depicted in FIG. 1 as a smart garage door sensor. The smart device 108D is depicted in FIG. 1 as a smart plug. However, the one or more smart devices 108A-D may include any smart devices, such as sensors, actuators, and/or computer devices. Details of the smart devices 108A-108D are discussed below with reference to FIGS. 2-4.

The server 110 includes a processing device and a data store. Processing device executes computer instructions stored in the data store. In some example aspects, the server 110 can be a single computing device such as a computer server. In other embodiments, the server 110 can represent more than one computing device working together to perform the actions of a server computer (e.g., cloud computing). The server 110 may host the web server communicably coupled to the browser at the client device (e.g., 104A-B) via the network 106. The server 110 may further be in communication with one or more remote servers either through the network 106 or through another network or communication means.

The one or more remote servers may perform various functionalities and/or storage capabilities described herein with regard to the server 110 either alone or in combination with the server 110. Each of the one or more remote servers may host various services. Each of the one or more remote servers can be a single computing device such as a computer server or can represent more than one computing device working together to perform the actions of a server computer (e.g., cloud computing). In one embodiment the server 110 and one or more remote servers may be implemented as a single server or across multiple servers. In one example, the server 110 and one or more remote servers may communicate through the user agent at the client device (e.g., electronic devices 104A-B) via network 106.

Figure 2A:
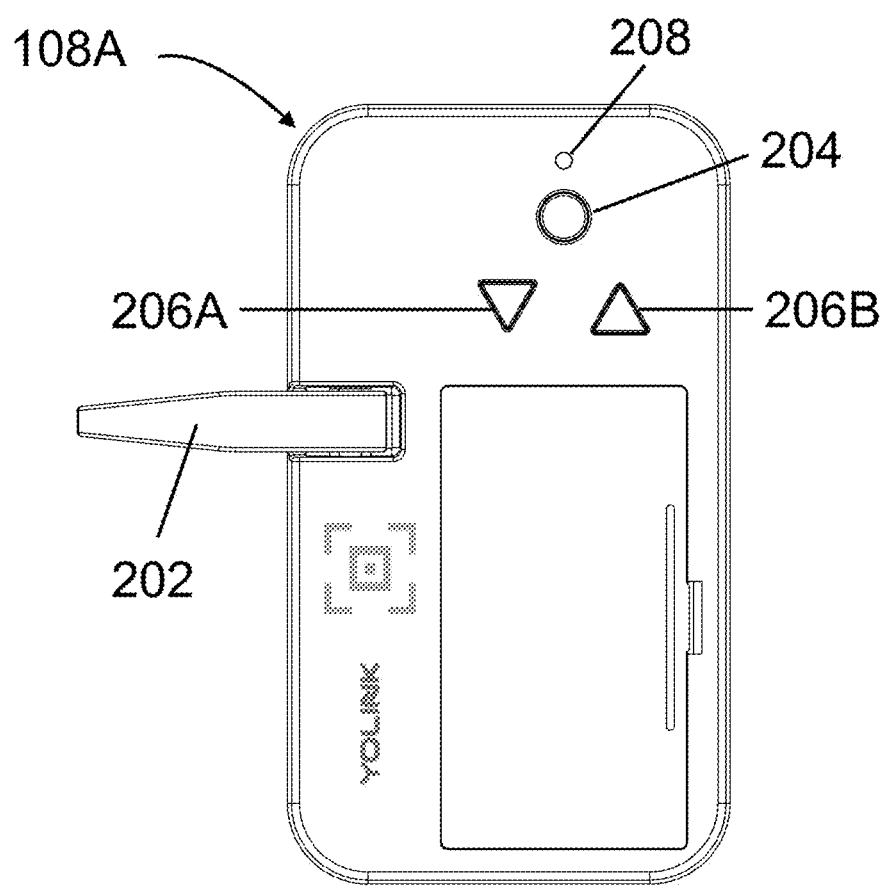
FIG. 2A is a schematic front view of an example smart device according to certain aspects of the disclosure.

FIG. 2A is a schematic front view of an example smart device according to certain aspects of the disclosure. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The smart device 108A is depicted as a smart garage door controller, including an actuator 202, a first button 204, a second button 206A, a third button 206B, an indictor 208, a control system (not shown), a motor (not shown), and a battery module (not shown).

The actuator 202 may perform a similar function as a human finger to control one or more devices, such as including a traditional garage door opener switch, which will be described in more details with reference to FIG. 2B.

The first button 204 may be triggered to control the smart device 108A to connect to the internet, to perform pairing and unpairing with other devices and/or send status information of the smart device 108A to a gateway, such as the gateway 102.

The second button 206A may be triggered to control the actuator 202 to move down, and the third button 206B may be triggered to control the actuator 202 to move up.

The indicator 208 may have a LED display signal of "GREEN ONCE" to indicate the status of "Open/Close the garage door". The indicator 208 may have a LED display signal of "BLINKING GREEN" to indicate the status of "Connecting to cloud". The indicator 208 may have a LED display signal of "FAST BLINKING GREEN" to indicate the status of "Paring with other devices". The indicator 208 may have a LED display signal of "FAST BLINKING RED" to indicate the status of "Unpairing with other devices". The indicator 208 may have a LED display signal of "BLINKING RED AND GREEN ALTERNATELY" to indicate the status of "Factory resetting".

In one example, the first button 204 is pressed once and the smart device 108A is configured to be connected to the internet. The indicator 208 may have a LED display signal of "BLINKING GREEN" to indicate the status of connecting to the cloud.

The control system may include one or more electronic circuitries, such as including a system on chip (SOC) with A field-programmable gate array (FPGA), microcontroller, Accelerated Processing Unit (APU) and/or peripheral electronic circuitries. In some aspects, the control system may include one or more wireless communication modules associated with a low-power wide-area network, such as a LoRa low-power wide-area network. In some aspects, the control system may include a motor driving unit to drive the motor to provide mechanical energy to the actuator 202.

The motor may be powered by the battery module to provide mechanical power to the actuator 202.

It can be now appreciated that a variety of embodiments of the smart device 108A may be employed. These embodiments may have different numbers and/or arrangements of the actuator 202, the first button 204, the second button 206A, the third button 206B, and the indictor 208. Those of ordinary skills in the art upon reading the present disclosure should become aware of how a smart device according to the present disclosure can be designed to satisfy particular needs.

Figure 2B:
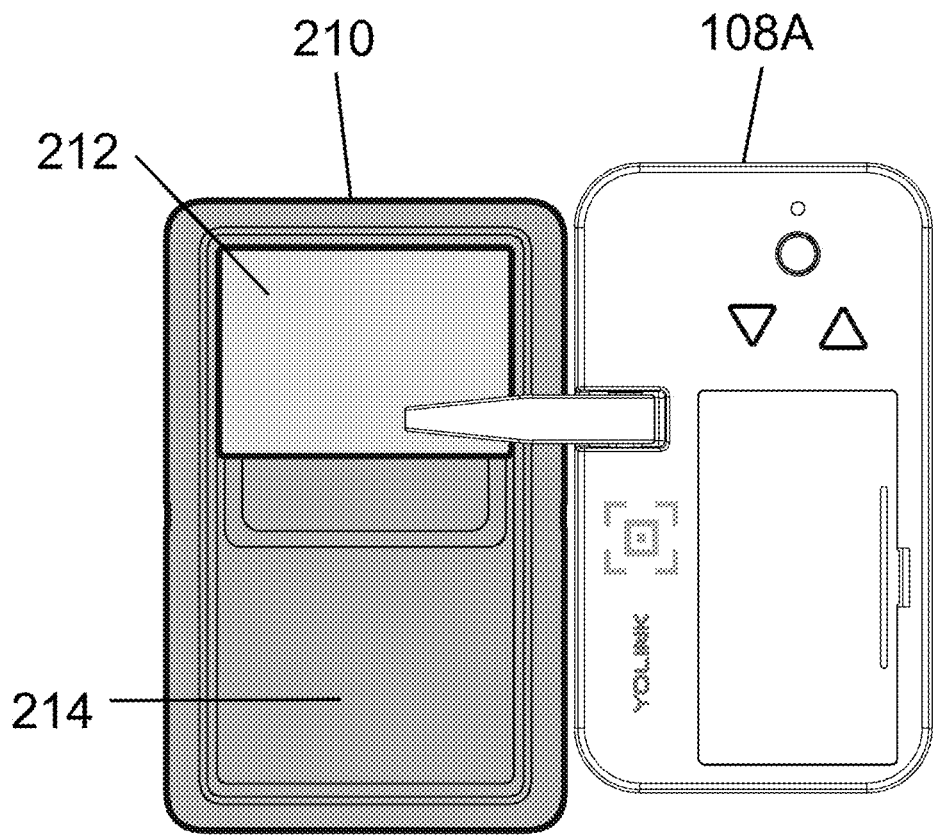
FIG. 2B illustrates an example environment in which the example smart device in FIG. 2A may be implemented according to certain aspects of the disclosure.

FIG. 2B illustrates an example environment in which the example smart device in FIG. 2A may be implemented according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 2B, the smart device 108A may be placed in adjacent to a garage door switch controller 210. The garage door switch controller 210 includes a switch 212 and a switch panel 214. The garage door switch controller 210 may be a traditional garage door switch controller located on a wall of a garage, which can be controlled by pushing the switch 212 to open a garage door. The smart device 108A may be spaced apart from the garage door switch controller 210 with a distance that a portion of the actuator may be in contact with the switch 212 to apply a force on the switch 212.

It can be now appreciated that a variety of embodiments of the smart device 108A and the garage door switch controller 210 may be employed. These embodiments may have different numbers and/or arrangements of the smart device 108A and the garage door switch controller 210. Those of ordinary skills in the art upon reading the present disclosure should become aware of how a smart device according to the present disclosure can be designed to satisfy particular needs.

Figure 3:
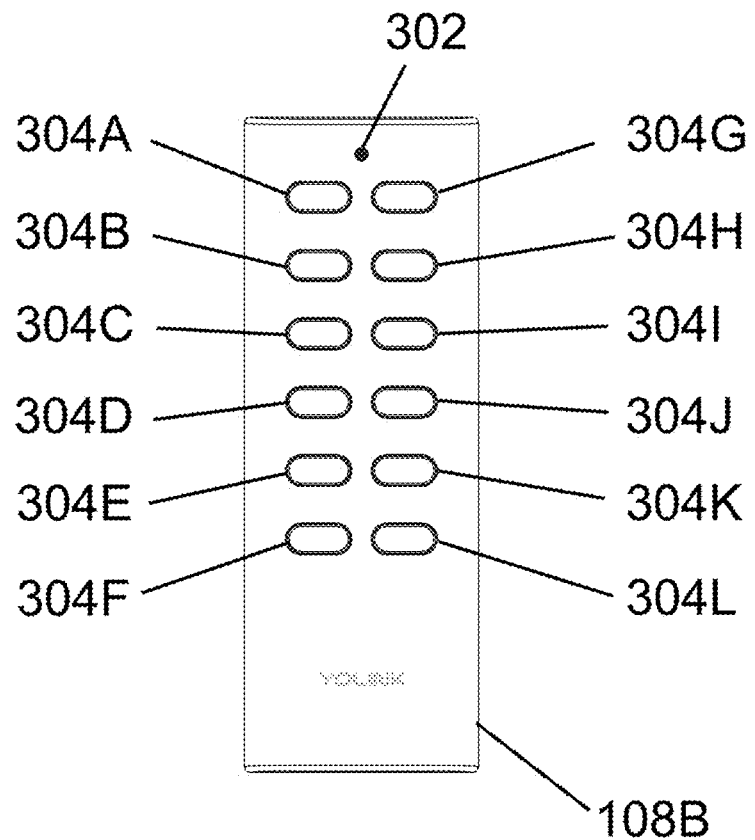
FIG. 3 illustrates an example smart device in accordance with one or more implementations.

FIG. 3 illustrates an example smart device in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

As shown in FIG. 3, the smart device 108B is depicted as a smart remote control, including an indictor 302 and one or more buttons 304A-L, and a battery module (not shown).

In some aspects, one of the one or more buttons 304A-L may be hold to starting a pairing process with the smart device 108A. The indicator 302 may have a LED display signal of flash green to indicate that the pairing process is started. After pairing with the smart device 108A is finished, the indicator 302 may not display any signal. One of the one or more buttons 304A-L may be hold to remote control the smart device 108A to control the actuator 202 to apply a force to the switch 212 of the garage door switch controller 210. In some aspects, after the smart device 108B and the smart device 108A is paired. One of the one or more buttons 304A-L may be hold to unpair the smart device 108B and the smart device 108A.

It can be now appreciated that a variety of embodiments of the smart device 108B may be employed. These embodiments may have different numbers and/or arrangements of the indictor 302, and the one or more buttons 304A-L. Those of ordinary skills in the art upon reading the present disclosure should become aware of how a smart device according to the present disclosure can be designed to satisfy particular needs.

Figure 4A:
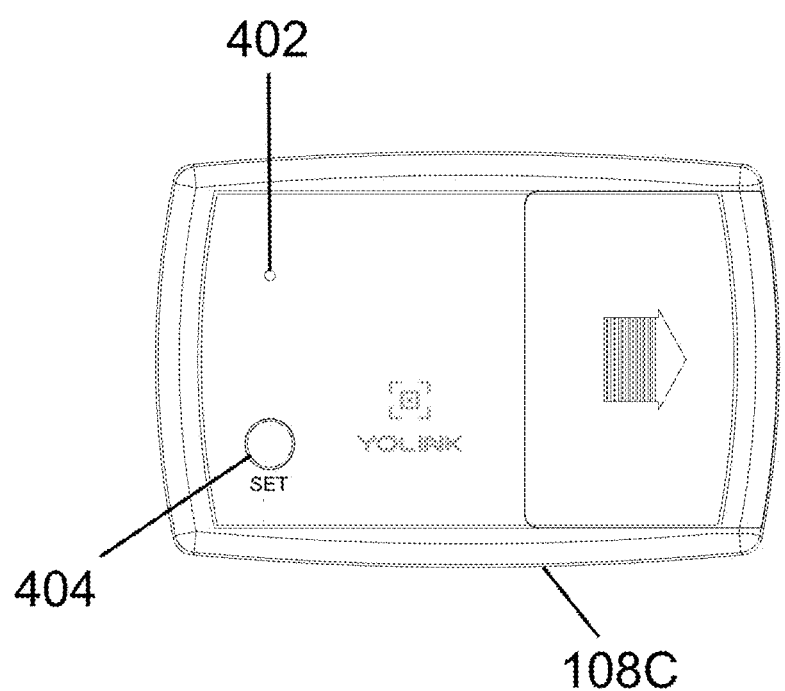
FIG. 4A illustrates an example smart device in accordance with one or more implementations.

FIG. 4A illustrates an example smart device in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

As shown in FIG. 4A, the smart device 108C is depicted as a smart door sensor, including an indictor 402 and a button 404, and one or more sensors (not shown) and a battery module (not shown).

The indicator 402 may have a LED display signal of "RED" once to indicate the status of an alert. The indicator 402 may have a LED display signal of "BLINKING GREEN" to indicate the status of "Connecting to cloud". The indicator 402 may have a LED display signal of "FAST BLINKING GREEN" to indicate the status of "Paring with other devices". The indicator 402 may have a LED display signal of "SLOW BLINKING GREEN" to indicate the status of "Updating". The indicator 402 may have a LED display signal of "FAST BLINKING RED" to indicate the status of "Unpairing with other devices". The indicator 402 may have a LED display signal of "BLINKING RED AND GREEN" to indicate the status of "Factory resetting".

In one example, the button 404 is pressed once and the smart device 108C is configured to be connected to the internet. The indicator 402 may have a LED display signal of "BLINKING GREEN" to indicate the status of connecting to the cloud.

In some aspects, the smart device 108C may be configured to detect an opening and/or closing of a door, such as including a garage door by using the one or more sensors. The one or more sensors may include one or more microelectro-mechanical systems (MEMS) sensors, such as an accelerometer and a gyroscope may be used to detect any change in motion.

It can be now appreciated that a variety of embodiments of the smart device 108C may be employed. These embodiments may have different numbers and/or arrangements of the indictor 402, and the button 404. Those of ordinary skills in the art upon reading the present disclosure should become aware of how a smart device according to the present disclosure can be designed to satisfy particular needs.

Figure 4B:
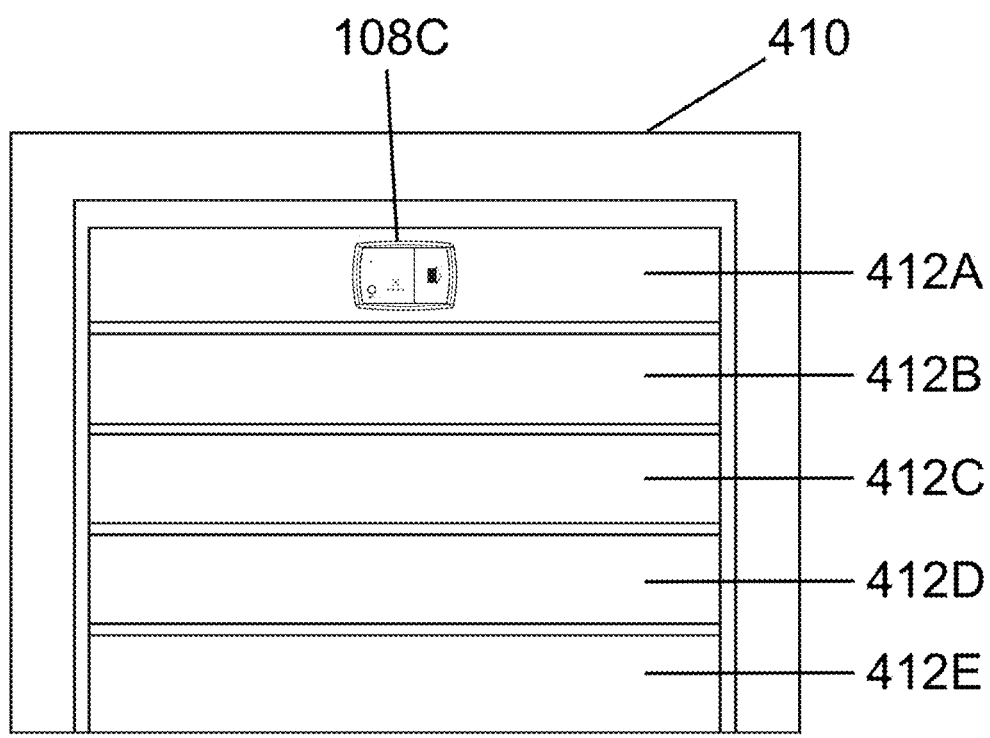
FIG. 4B illustrates an example environment in which the example smart device in FIG. 4A may be implemented according to certain aspects of the disclosure.

FIG. 4B illustrates an example environment in which the example smart device in FIG. 4A may be implemented according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 4B, the smart device 108C is attached to a garage door 410. The garage door 410 may include a plurality of panels 412A-412E.

It can be now appreciated that a variety of embodiments of the smart device 108C and the garage door 410 may be employed. These embodiments may have different numbers and/or arrangements of the smart device 108C and the garage door 410. Those of ordinary skills in the art upon reading the present disclosure should become aware of how a smart device according to the present disclosure can be designed to satisfy particular needs.

Figure 4C:
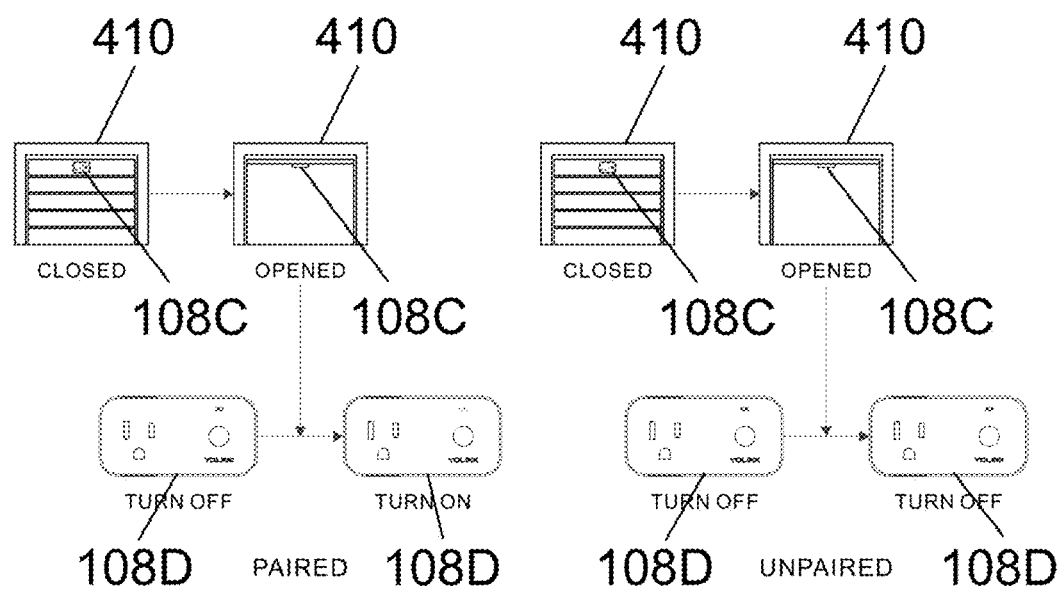
FIG. 4C illustrates an example environment in which the example smart device in FIG. 2A may be implemented according to certain aspects of the disclosure.

FIG. 4C illustrates an example environment in which the example smart device in FIG. 2A may be implemented according to certain aspects of the disclosure. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

In some aspects, the smart device 108C is paired with the smart device 108D, which is illustrated as a smart plug. When the garage door 410 is detected by the smart device 108C as opened, the smart device 108D is configured to be turned on from an initial turn-off state.

In some aspects, the smart device 108C is unpaired with the smart device 108D, which is illustrated as a smart plug. When the garage door 410 is detected by the smart device 108C as opened, the smart device 108D is configured to be an initial turn-off state.

It can be now appreciated that a variety of embodiments of the smart device 108C and the smart device 108D may be employed. These embodiments may have different numbers and/or arrangements of the smart device 108C and the smart device 108D. In some aspects, the smart device 108D may include one or more smart switch, smart power outlet, smart power strip, and other smart devices. Those of ordinary skills in the art upon reading the present disclosure should become aware of how a smart device according to the present disclosure can be designed to satisfy particular needs.

Figure 5A:
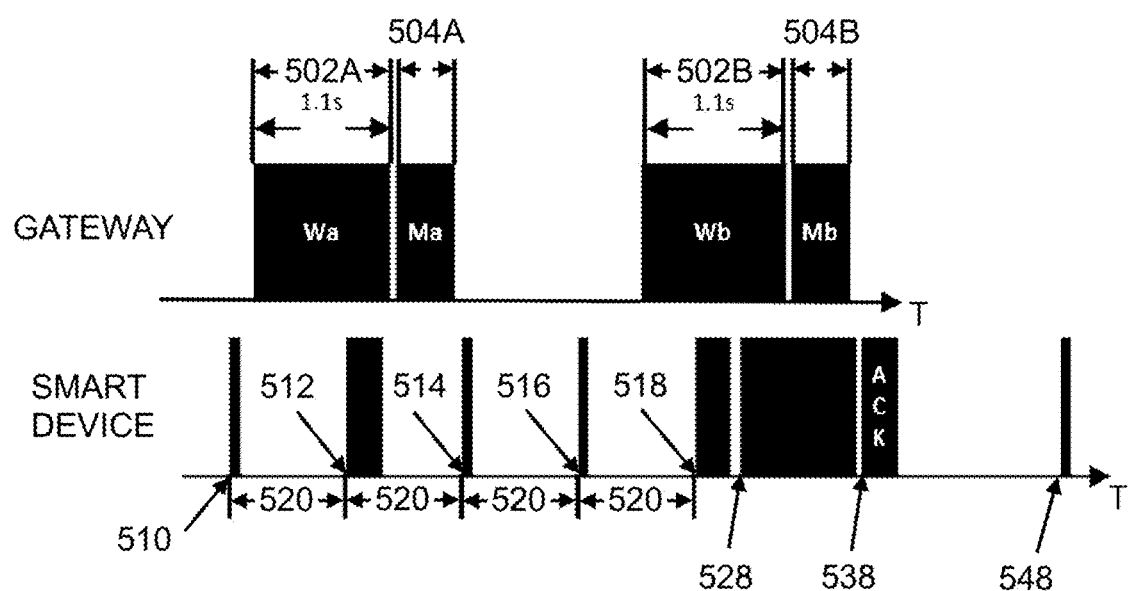
FIG. 5A illustrates a communication between an example gateway and an example smart device of FIG. 1 in accordance with one or more implementations.

FIG. 5A illustrates a communication between an example gateway and an example smart device of FIG. 1 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

As described above, the one or more smart devices 108A-D may include one or more batteries. In order to save battery power, the one or more smart devices 108A-D may be in a sleep mode, such as a lower power mode that most of the active/power consuming features are not performed. The one or more smart devices 108A-D may transit from the sleep mode to an active mode when it is determined that a gateway is send a request to wake up the one or more smart devices 108A-D from a sleep mode. The one or more smart devices 108A-D may be configured to be awake periodically. In the waking-up period, if it is determined that the one or more smart devices 108A-D is not in a wake-up mode, then the one or more smart devices 108A-D is configured to be in the sleep mode to save power. In the waking-up period, if it is determined that the one or more smart devices 108A-D is in a wake-up mode, then the one or more smart devices 108A-D is configured to receive a control message from the gateway and perform one or more activities in association with the control message.

In FIG. 5A, the example gateway is illustrated as the gateway 102 and the example smart device is illustrated as the smart device 108A. In some aspects, the example smart device may include the smart device 108B, 108C and/or 108D or other smart devices. In FIG. 5A, a communication, such as a packet communication is illustrated between the gateway 102 and the smart device 108A. As shown in FIG. 5A, the gateway 102 is configured to transmit a first sequence including a wake message 502A and a control message 504A, and a second sequence including a wake message 502B and a control message 504B. In some aspects, the time interval between the wake message 502A and the control message 504A is smaller than 1 ms. Alternatively, or in addition, the time interval between the wake message 502A and the control message 504A is between 1 ms to 1 s. In some aspects, the time interval between the wake message 502A and the control message 504A is as small as possible. The wake messages 502A and/or 502B may contain information that is associated with the identification of the one or more devices to be woken up, such as a device address. The control messages 504A and/or 504B may contain one or more instructions that the one or more devices woken up are configured to receive and execute. In some examples, the one or more devices woken up are configured to transmit information to the gateway 102 by executing the one or more instructions in the control messages 504A and/or 504B. In some examples, the one or more devices woken up are configured to up to perform one or more activities, such as to collect data from one or more associated sensors and/or control one or more associated sensors and/or actuators, by executing the one or more instructions in the control messages 504A and/or 504B. In some aspects, the wake message 502A is substantially the same as the wake message 502B. In some aspects, the control message 504A is substantially the same as the control message 504B.

In some aspects, the gateway 102 may transmit the wake message 502A and/or 502B at the frequency for wireless communication, such as 915.8 MHz.

In some aspects, the smart device 108A may be periodically woken up from a sleep mode at a wake time interval 520, for example, at a time interval of approximately 1 s, to perform a channel activity detection at the wake frequency. That is, the smart device 108A may be periodically woken up from a sleep mode approximately every 1 s. The time duration of the wake message 502A and/or 502B may be determined in association with the wake time interval of the smart device 108A, such as larger by 0.01-20% of the wake time interval. For example, when the wake time interval is approximately 1 s, then the time duration of the wake message 502A and/or 502B may be approximately 1.01 s to 1.2 s, to have some amount of redundancy and reduce unnecessary waste of power. In some aspects, the time duration of the wake message 502A and/or 502B may be approximately 1.1 s. The time duration of the control messages 504A and/or 504B may be determined by the communication protocol of the gateway 102, such as a LPWA network, including for example, LoRa wide-area network technology. In some aspects, the time duration of control messages 504A and/or 504B may include a time duration of a preamble, a spreading factor, a bandwidth, and/or CRC check. In some aspects, the time duration of control messages 504A and/or 504B may be approximately 50 ms, or less than 100 ms.

As shown in FIG. 5A, at time 510, the smart device 108A is configured to be woken up. Then, the smart device 108A is configured to perform a channel activity detection at the wake frequency. When it is determined that no wake message is detected, the smart device 108A is configured to be in a sleep mode. The smart device 108A may be periodically woken up from a sleep mode at the wake time interval 520, such as 1 s.

At time 512, which is approximately 1 s after time 510, the smart device 108A is configured to be woken up. When it is determined that at least a part of a wake message is detected, the smart device 108A is configured to detect whether the device to be woken up is the smart device 108A. When it is determined that the device to be woken up is not the smart device 108A, the smart device 108A is configured to be in a sleep mode. The smart device 108A may be periodically woken up from a sleep mode at the wake time interval 520, such as 1 s.

At time 514, which is approximately 1 s after time 512, the smart device 108A is configured to be woken up. Then, the smart device 108A is configured to perform a channel activity detection at the wake frequency. When it is determined that no wake message is detected, the smart device 108A is configured to be in a sleep mode. The smart device 108A may be periodically woken up from a sleep mode at the wake time interval 520, such as 1 s.

At time 516, which is approximately 1 s after time 514, the smart device 108A is configured to be woken up. Then, the smart device 108A is configured to perform a channel activity detection at the wake frequency. When it is determined that no wake message is detected, the smart device 108A is configured to be in a sleep mode. The smart device 108A may be periodically woken up from a sleep mode at the wake time interval 520, such as 1 s.

At time 518, which is approximately 1 s after time 516, the smart device 108A is configured to be woken up. Then, the smart device 108A is configured to perform a channel activity detection at the wake frequency. When it is determined that a wake message associated with the smart device 108A, such as the wake message 502B is detected, at time 528, the smart device 108A is configured to switch to a downlink communication frequency of the gateway 102 and receive one or more control messages, such as the control message 504B. At time 538, the smart device 108A is configured to send an acknowledgment message to the gateway 102 to acknowledge that the one or more control messages are received. The smart device 108A may be periodically woken up at time 548 from a sleep mode at the wake time interval 520, such as 1 s.

It can be now appreciated that a variety of embodiments of the communication between the example gateway and the example smart device may be employed. These embodiments may have different numbers and/or arrangements between the communication between the gateway 102 and the smart device 108A. Those of ordinary skills in the art upon reading the present disclosure should become aware of how a communication between the gateway and the smart device according to the present disclosure can be designed to satisfy particular needs.

Figure 5B:
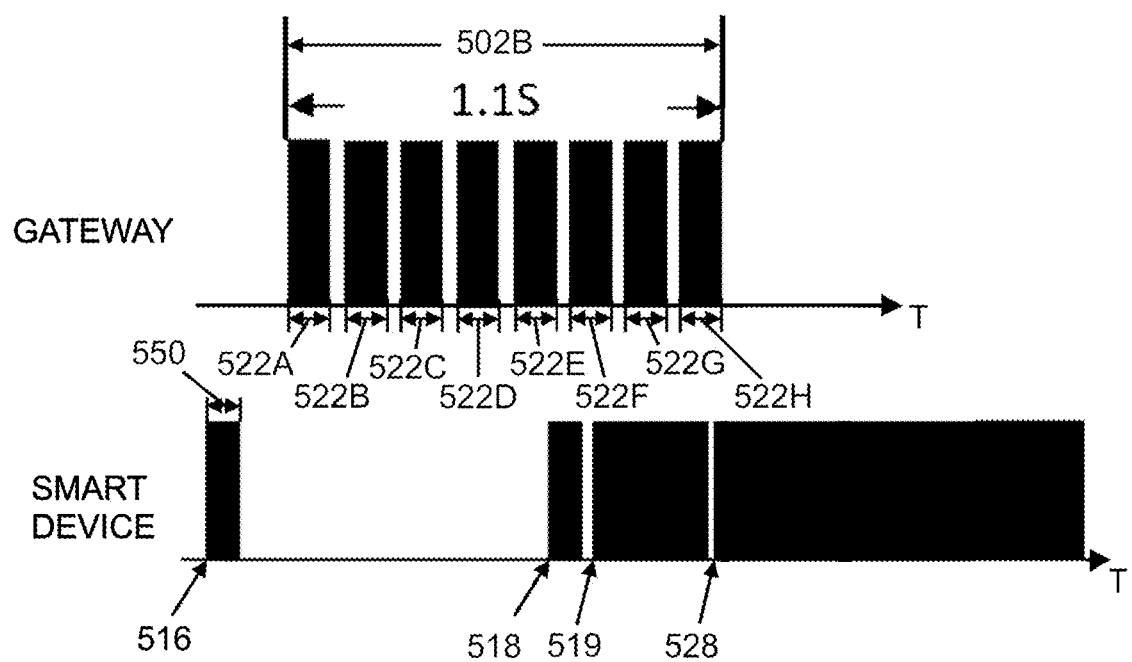
FIG. 5B illustrates a communication between the example gateway and the example smart device of FIG. 5A in accordance with one or more implementations.

FIG. 5B illustrates a communication between the example gateway and the example smart device of FIG. 5A in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

As shown in FIG. 5B, the wake message, such as the wake message 502B includes a plurality of sub-sequences 522A, 522B, 522C, 522D, 522E, 522F, 522G, 522H. Each of the sub-sequences 522A, 522B, 522C, 522D, 522E, 522F, 522G, 522H may be substantially the same and spaced apart with a fixed time interval. In some aspects, the fixed time interval between each of the sub-sequences 522A, 522B, 522C, 522D, 522E, 522F, 522G, 522H is 1 ms or less. As shown in FIG. 5B, the wake message 502B includes eight sub-sequences; however, the number of sub-sequences in the wake message 502B is not limited to eight, and may be two, three, four, five, six, seven, or more. Each of the sub-sequences 522A, 522B, 522C, 522D, 522E, 522F, 522G, 522H may include a preamble, and a payload to include information associated with the wake information, such as an address of the device to be woken up. In some aspects, a frame format of each of the sub-sequences 522A, 522B, 522C, 522D, 522E, 522F, 522G, 522H may be associated with an address of the smart device 108A.

As shown in FIG. 5B and described with reference to FIG. 5A, at time 516, the smart device 108A is configured to be woken up. Then, the smart device 108A is configured to perform a channel activity detection at the wake frequency for a time duration 550. When it is determined that no wake message is detected, the smart device 108A is configured to be in a sleep mode.

At time 518, which is approximately is after time 516, the smart device 108A is configured to be woken up. Then, the smart device 108A is configured to perform a channel activity detection at the wake frequency. The time duration 550 may be a plurality of time durations for performing a channel activity detection, such as for example, twice as the time durations of the channel activity detection. The time duration of performing a channel activity detection may be determined by a spreading factor, a bandwidth associated with a wireless communication technology used. For example, the time duration of performing a channel activity detection may be determined as 1.02 ms, by using LoRa technology. The time duration 550 may be determined to be 2.04 ms.

When it is determined that a wake message is detected, such as the wake message 502B is detected, at time 519, the smart device 108A is configured to receive a complete wake sub-sequence, such as one of the sub-sequences 522A, 522B, 522C, 522D, 522E, 522F, 522G, 522H, after a wait period, such as 200 ms. The wait period may be determined by a length of a packet in the wake message, and/or a delay for enough time to wait and receive one or more packets in the wake message. In some aspects, a length of a packet in the wake message may be 33 ms, and the delay for enough time to wait and receive one or more packets in the wake message may be 70 ms, and the wait period may be determined as 200 ms to be able to tolerate two packets in the wake message.

When it is determined that a complete wake sub-sequence in the wake message 502B is detected, at time 528, the smart device 108A is configured to determine whether the device to be woken up is the smart device 108A. Alternatively, when it is determined that no complete wake sub-sequence in the wake message 502B is detected, at time 528, the smart device 108A is configured to in a sleep mode and woken up periodically as shown in FIG. 5A. When it is determined that the device to be woken up is the smart device 108A, the smart device 108A is configured to switch to a downlink communication frequency of the gateway 102 and communicate with the gateway 102 after a delay in time, such as for example, 4 s. The smart device 108A is configured to receive one or more control messages, such as the control message 504B. Alternatively, when it is determined that the device to be woken up is not the smart device 108A, the smart device 108A is configured to in a sleep mode and woken up periodically as shown in FIG. 5A.

It can be now appreciated that a variety of embodiments of the communication between the example gateway and the example smart device may be employed. These embodiments may have different numbers and/or arrangements between the communication between the gateway 102 and the smart device 108A. Those of ordinary skills in the art upon reading the present disclosure should become aware of how a communication between the gateway and the smart device according to the present disclosure can be designed to satisfy particular needs.

Figure 6:
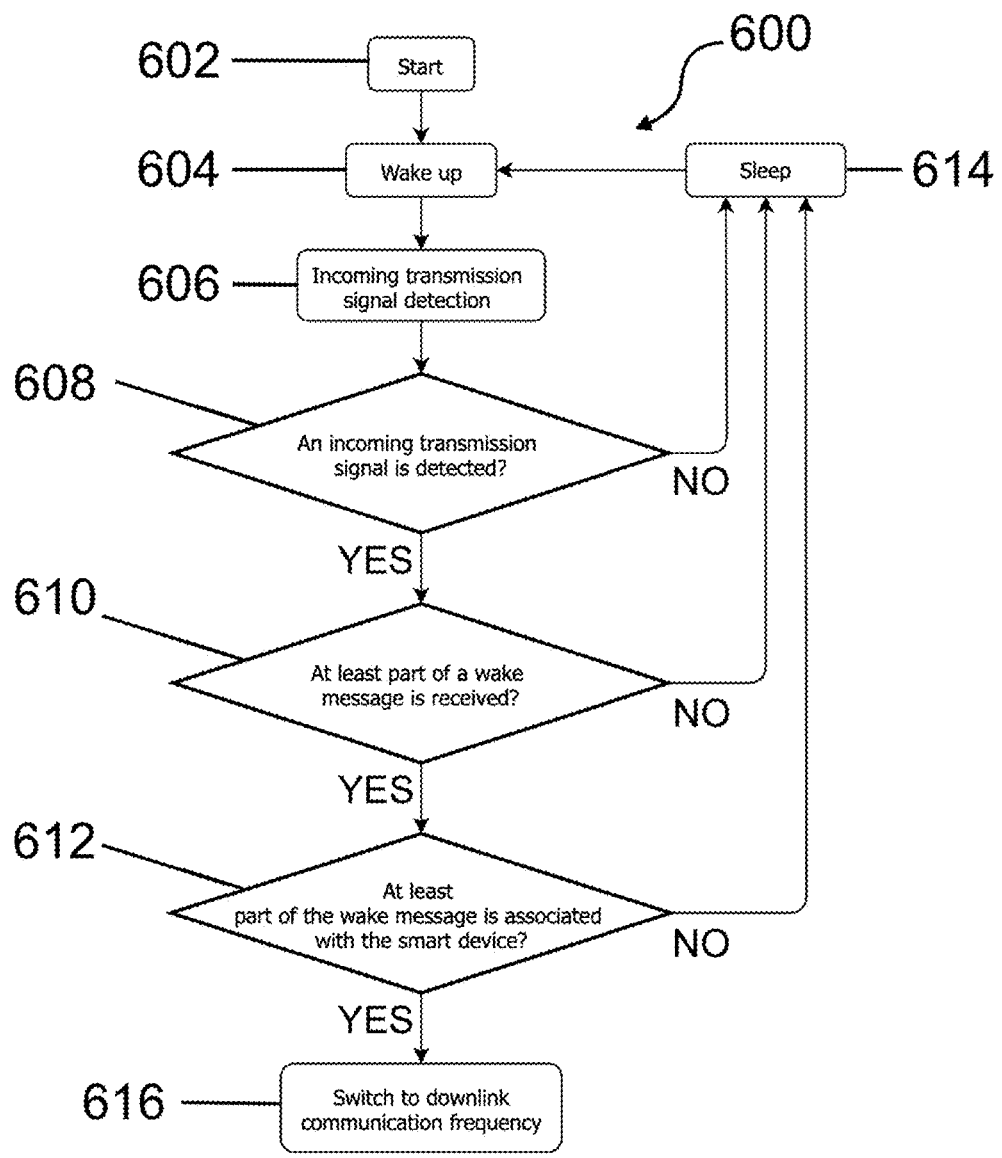
FIG. 6 illustrates a flow diagram of an example process for a communication between an example gateway and an example smart device of FIGS. 5A-5B in accordance with one or more implementations.

FIG. 6 illustrates a flow diagram of an example process for a communication between an example gateway and an example smart device of FIGS. 5A-5B in accordance with one or more implementations. For explanatory purposes, the example process 600 is primarily described herein with reference to the gateway 102 and one of the smart devices 108A-D of FIGS. 5A-5B; however, the example process 600 is not limited to the gateway 102 and one of the smart devices 108A-D of FIGS. 5A-5B, and the example process 600 may be performed by one or more components of the gateway 102 and one of the smart devices 108A-D of FIGS. 5A-5B. Further for explanatory purposes, the blocks of the example process 600 are described herein as occurring in serial, or linearly. However, multiple blocks of the example process 600 may occur in parallel. In addition, the blocks of the example process 600 may be performed a different order than the order shown and/or one or more of the blocks of the example process 600 may not be performed.

Following start block 602, a smart device, such as the smart device 108A, is woken up from a sleep mode, at block 604. The smart device may be periodically woken up as described with reference to FIGS. 5A-5B.

At block 606, the smart device performs an incoming transmission signal detection after the smart device is woken up. In some aspects, the smart device may perform the incoming transmission signal detection, such as a channel activity detection at the frequency for wireless communication, such as 915.8 MHz.

At decision block 608, the smart device determines if an incoming transmission signal is detected. For example, the incoming transmission signal may include a frequency range of 910.3 Mhz-923.9 Mhz. The smart device may perform a channel activity detection, as described with reference to FIGS. 5A-5B. In some aspects, the smart device may detect no incoming transmission signal. Then, the smart device may send a timeout signal to the controller to indicate that the no incoming transmission signal is received. The smart device may determine again if there is an incoming transmission, such as performing a channel activity detection again.

At decision block 608, if it is determined that an incoming transmission signal is detected, such as a LoRa signal, then the smart device determines if at least part of a wake message is received at decision block 610. In some aspects, the at least part of a wake message may include a sub-sequence in the wake message as described with reference to FIGS. 5A-5B.

At decision block 610, if it is determined that at least part of a wake message is received, then the smart device determines if the at least part of the wake message is associated with the smart device at decision block 612.

At decision block 612, if it is determined that at least part of the wake message is associated with the smart device at decision block 612, the smart device switches to a downlink communication frequency at block 616, as described with reference to FIGS. 5A-5B.

Otherwise, if at decision block 612, it is determined that the at least part of the wake message is not associated with the smart device at decision block 612, the smart device is in a sleep mode at block 614.

Otherwise, if at decision block 610, if it is determined that at least part of a wake message is not received, the smart device is in a sleep mode at block 614.

Otherwise, if at decision block 608 it is determined that an incoming transmission signal is not detected, the smart device is in a sleep mode block 614.

At block 614, the smart device may be in a sleep mode and woken up at block 604.

Figure 7:
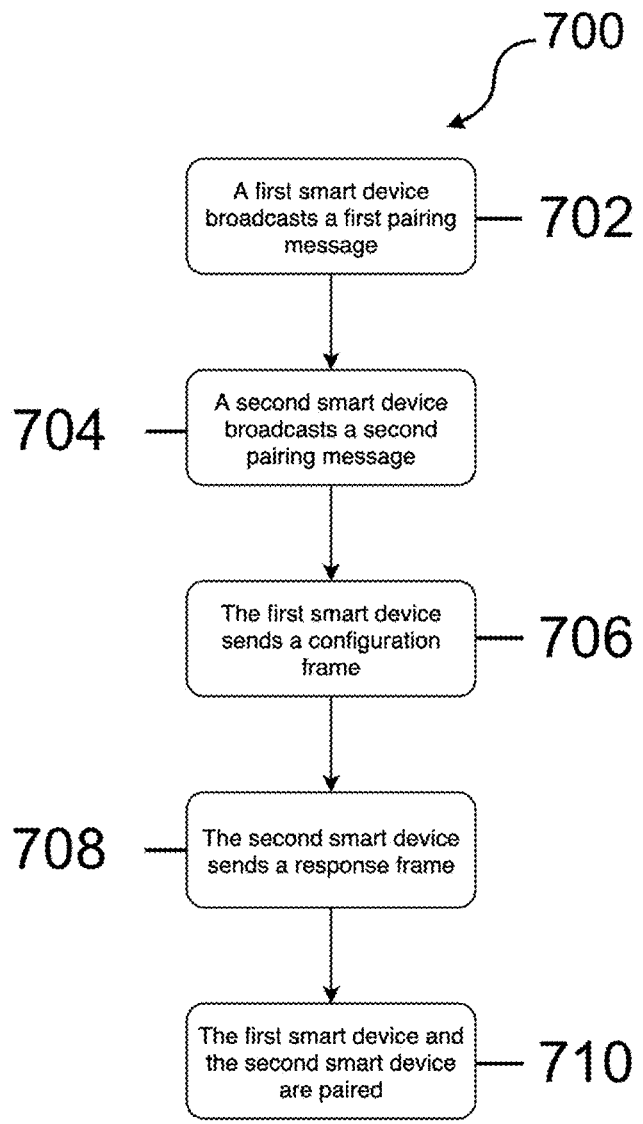
FIG. 7 illustrates a flow diagram of an example process for a communication between a plurality of example smart devices of FIGS. 5A-5B in accordance with one or more implementations.

FIG. 7 illustrates a flow diagram of an example process for a communication between a plurality of example smart devices of FIGS. 5A-5B in accordance with one or more implementations. For explanatory purposes, the example process 700 is primarily described herein with reference to the smart device 108A and the smart device 108B of FIGS. 5A-5B; however, the example process 700 is not limited to the smart device 108A and the smart device 108B of FIGS. 5A-5B, and the example process 700 may be performed by one or more components of the smart device 108A and the smart device 108B of FIGS. 5A-5B. Further for explanatory purposes, the blocks of the example process 700 are described herein as occurring in serial, or linearly. However, multiple blocks of the example process 700 may occur in parallel. In addition, the blocks of the example process 700 may be performed a different order than the order shown and/or one or more of the blocks of the example process 700 may not be performed.

In some aspects, the smart device 108A and the smart device 108B of FIGS. 5A-5B may communicate and exchange information by a mutual control technology, such as without connecting directly or indirectly to the internet and/or a network. In some aspects, when there is network connection issue, such as an outrage, a high real-time performance may be achieved by implementing the mutual control technology. In some aspects, the mutual control technology may include two processes: a pairing process and/or a control process. After the pairing process is completed, the control process may be initiated. The information associated with the pairing process may be stored in the smart device 108A and/or the smart device 108B. In some aspects, the control process may be initiated without starting a pairing process, when the information associated with a previous pairing process is stored in the smart device 108A and/or the smart device 108B.

At block 702, the smart device 108B broadcasts a first pairing message. In some aspects, the smart device 108B broadcasts the first pairing message, upon receiving an indication for pairing, such as that a user presses one or more buttons on the smart device 108B to start a pairing process. In some aspects, the smart device 108B may act as a master device. The first pairing message may include a frame with a format as below:

TABLE 1

| From ID | To ID | Msg Flag | Cmd | DATA | Link mode | Resv | Resv | Resv | Resv |
|---|---|---|---|---|---|---|---|---|---|
| 5 Bytes | 5 Bytes | 0x80 | 0x08 | 1 Byte | 0x01/0x03 | 1 Byte | 4 Bytes | 4 Bytes | 1 byte |

At block 704, the smart device 108A broadcasts a second pairing message. In some aspects, the smart device 108A broadcasts the second pairing message, upon receiving an indication for pairing, such as that a user presses one or more buttons on the smart device 108A to start a pairing process. In some aspects, the smart device 108A may act as a slave device.

The second pairing message may include a frame with a format as below:

TABLE 2

| From ID | To ID | Msg Flag | Cmd | DATA | Link mode | Resv | Resv | Resv | Resv |
|---|---|---|---|---|---|---|---|---|---|
| 5 Bytes | 5 Bytes | 0x80 | 0x08 | 1 Byte | 0x00/0x03 | 1 Byte | 4 Bytes | 4 Bytes | 1 byte |

After receiving the second pairing message from the smart device 108A, the smart device 108B searches a file managed by the smart device 108B to set a configuration frame for configuring the smart device 108A. At block 706, the smart device 108B send the configuration frame to the smart device 108A.

The configuration frame may include a format as below:

TABLE 3

| From ID | To ID | Msg Flag | Cmd | Slot | Link mode | Link Group | UID | RollNum | Sn |
|---|---|---|---|---|---|---|---|---|---|
| 5 Bytes | 5 Bytes | 0x00 | 0x08 | 1 Bytes | 0x01 | 1 Byte | 4 Bytes | 4 Bytes | 1 byte |

After receiving the configuration frame, the smart device 108A saves the information of the smart device 108B in a table, and sends a response frame at block 708. After receiving the response frame of the smart device 108A, the smart device 108B saves the information of the smart device 108A.

The response frame may include a format as below:

TABLE 4

| From ID | To ID | Msg Flag | Cmd | Slot mode | Link Group | Link | UID | RollNum | Sn |
|---|---|---|---|---|---|---|---|---|---|
| 5 Bytes | 5 Bytes | 0x20 | 0x08 | 1 Bytes | 0x00 | 1 Byte | 4 Bytes | 4 Bytes | 1 byte |
| Class | | Status | res | res | | | | | |
| Bit7-bit4 | Bit3-bit0 | 1 byte | 1 byte | 1 byte | | | | | |

In one or more formats described above with reference to Tables 1-4, the field of "From ID" may refer to an address of a transmitting device. The field of "To ID" may be associated with an address of a receiving device. The field of "Msg" may be associated with a type of the message. The field of "Cmd" may be associated with a command code. The field of "Slot" may be associated with a time slot. The field of "Link" may be associated with a pairing mode. The field of "UID" may be associated with a unique identifier. The field of "Sn" may be associated with a serial number. The field of "Resv" may be associated with a reserved field. The field of "RollNum" may include the field of "Class", "Status", and "res", as depicted in Table 4. In some aspects, the field of "Class" may be associated with "Class A", which is associated with a type of the device that is battery powered and cannot be awakened by other devices, when the Bit3-bit0 is 0x01. In some aspects, the field of "Class" may be associated with "Class C", which is associated with a type of the device that is not battery powered, when the Bit3-bit0 is 0x02. In some aspects, the field of "Class" may be associated with "Class D", which is associated with a type of the device that is battery powered and can be awakened by other devices, when the Bit3-bit0 is 0x03. In some aspects, the field of "Status" may be associated with a status of the device, such as the smart device 108A.

The smart device 108B and the smart device 108A are determined to be paired at block 710, after receiving the response frame of the smart device 108A.

In some aspects, after the smart device 108B and the smart device 108A are paired, when one of the smart devices 108A and 108B has a change in the device status, such as the smart device 108A, then the smart device 108A may send the information associated with the change in the device status to the smart device 108B. The smart device 108B may perform one or more operations accordingly.

Therefore, this process may increase the flexibility of use for the smart devices, and improve the reliability and fast response capability of the control of the smart devices. In some aspects, the distance that each of the smart devices can be controlled may not be affected by the signal of the gateway, which improves the stability of communication.

Figure 8:
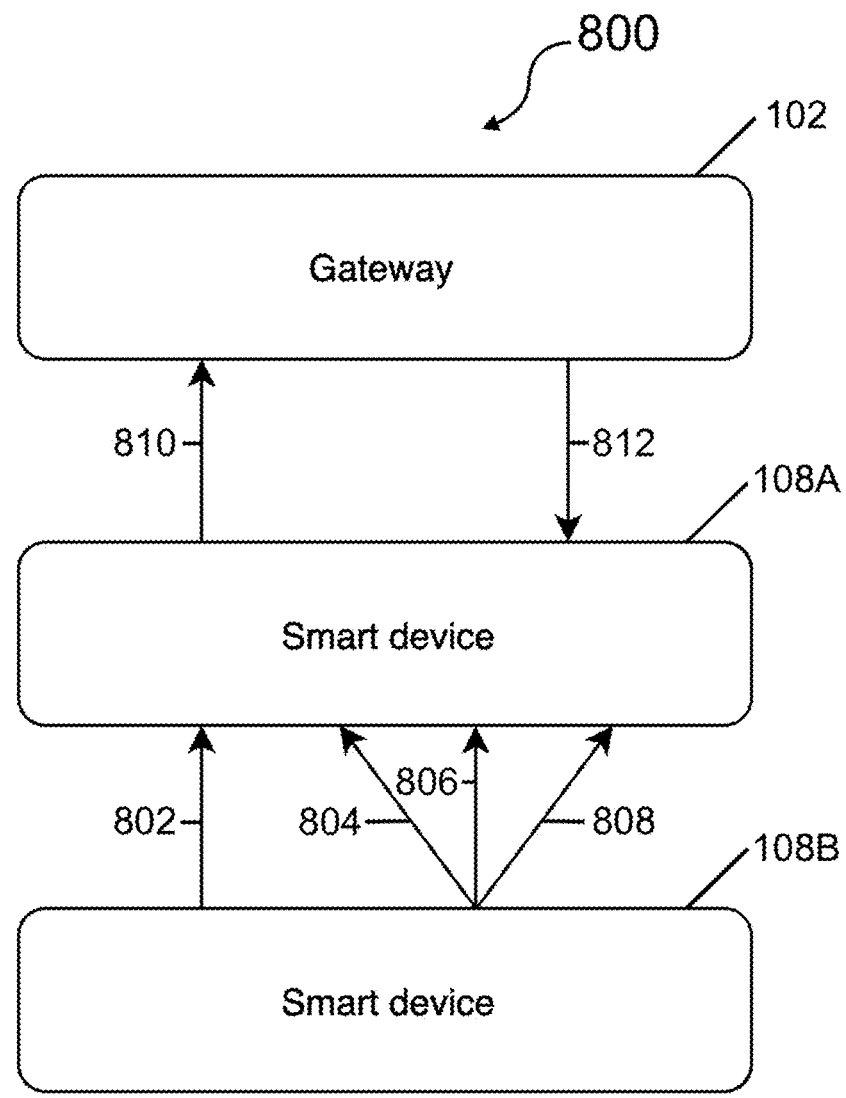
FIG. 8 illustrates a flow diagram of an example process for a communication between a plurality of example smart devices of FIGS. 5A-5B in accordance with another implementation.

FIG. 8 illustrates a flow diagram of an example process for a communication between a plurality of example smart devices of FIGS. 5A-5B in accordance with another implementation. For explanatory purposes, the example process 800 is primarily described herein with reference to the smart device 108A and the smart device 108B of FIGS. 5A-5B; however, the example process 800 is not limited to the smart device 108A and the smart device 108B of FIGS. 5A-5B, and the example process 800 may be performed by one or more components of the smart device 108A and the smart device 108B of FIGS. 5A-5B. Further for explanatory purposes, the blocks of the example process 800 are described herein as occurring in serial, or linearly. However, multiple blocks of the example process 800 may occur in parallel. In addition, the blocks of the example process 800 may be performed a different order than the order shown and/or one or more of the blocks of the example process 800 may not be performed.

In some aspects, the example process 800 may be performed after the example process 700 is completed. For example, the example process 800 may be performed after the smart device 108B and the smart device 108A are paired.

At step 802, the smart device 108B sends a wake message, such as a wake frame. In some aspects, a user may press one or more buttons on the smart device 108B to initiate the smart device 108B to send the wake message. In some aspects, the one or more buttons may be associated with a pairing information stored in the smart device 108B. For example, a button that is pressed may be associated with a paired device, such as for example, the smart device 108A.

At step 804, the smart device 108B broadcasts a control message, such as a control frame as below:

TABLE 5

| From ID | To ID | Msg | Cmd | slot | Data | Group | Rolling Num | SN | Checksum |
|---------|-------|-----|-----|------|------|-------|-------------|-----|----------|
| 5 Bytes | 5 Bytes | 1 Bytes | 1 Bytes | 1 Bytes | 1 Bytes | 1 Byte | 4 Byte | 1 Byte | 4 Bytes |

In some aspects, as described above with reference to Table 5, the field of "From ID" may be associated with an address of a transmitting device, such as the address of the smart device 108B. The field of "To ID" may be associated with a network scale and/or a broadcast address. The field of "Msg" may be associated with a type of the message, such as a multicast message. The field of "Cmd" may be associated with a command. The field of "Slot" may be associated with a number associated with a time-slot. The field of "Data" may be associated with a control status. The field of "Group" may be associated with a group number. The field of "RollingNum" may be associated with a rolling number of the control device. The field of "SN" may be associated with a serial number of the pairing process. The field of "Checksum" may be associated with a check of the device.

The smart device 108B may search, according to a stored table, for a list of paired devices corresponding to the button pressed on the smart device 108B. As described in details with reference to FIG. 7 after receiving the response frame of the smart device 108A, the smart device 108B saves the information of the smart device 108A.

In some aspects, when the smart device 108B is not paired with any device, the number of paired devices is 0 after the button is pressed. No action is performed by the smart device 108B after the button is pressed.

In some aspects, the smart device 108B finds a smart device, such as the smart device 108A, after the search according to the stored table, as a paired device corresponding to the button pressed on.

At step 804, the smart device 108B sends out a control frame and defines the number of the time-slot associated with the control frame as 0. At step 806, the smart device 108B defines a width of a time-slot to be 200 ms. When it is a time-out, the smart device 108B sends out a control frame again and defines the number of the time-slot associated with the control frame as 1. At step 808, the smart device 108B defines a width of a time-slot to be 200 ms. When it is a time-out, the smart device 108B sends out a control frame again and defines the number of the time-slot associated with the control frame as 2.

At step 810, the smart device 108A receives the control frame sent by the smart device 108B, and starts timing according to the time-slot assigned by the smart device 108B. When a time-out is associated with the time-slot, the smart device 108A sends a frame indicating a status change to the gateway 102.

At step 812, the gateway 102 receives the frame indicating the status change, and sends an acknowledgement, such as an acknowledgement frame to the smart device 108A.

In some aspects, the gateway 102 may communicate with the server 110 and send the acknowledgement to the server 110.

Because the process of controlling, reporting and confirming is ended above with reference to the step 812, it does not affect the remote control of the smart device 108A when the gateway 102 is not online.

In some aspects, the network scale field in the control frame sent by the smart device 108B may be used by the smart device 108B to notify the number of devices controlled by the smart device 108B, for example, including the smart device 108A. The smart device 108A may be informed of the time for the smart device 108B to finish reporting all the devices controlled by the smart device 108B to the server 110.

In some aspects, the width of a time-slot may be associated with the time of sending the frame associated with the time-slot. In some aspects, according to the calculation formula provided by LoRa modulation, the time of sending the frame may be associated with a length of frame, the spreading factor, the bandwidth, the preamble, CRC, and the preceding error correction configuration. In addition, considering the signal conflict detection, the width of a time-slot>time of a frame+collision detection time.

In some aspects, due to the size and the frame length of the control frame of the smart device 108B and/or the frame indicating a status change reported by the smart device 108A are not very different, the width of a time-slot is approximately 200 ms. That is, the width of a time-slot associated with the control frame sent by the smart device 108B and the width of a time-slot associated with the frame indicating a status change reported by the smart device 108A are substantially the same.

In some aspects, the field of "data" in the frame associated with time-slot 1 and the frame associated with time-slot 2 may be different from the present disclosure.

In some aspects, after the smart device 108B sends the control frame, the smart device 108A compares a configuration number with the field of "SN" of the control frame to determine if there are one or more operations to be performed. The smart device 108A sends an uplink gateway frame to the gateway 102 in accordance with the number associated with a time-slot, to avoid conflict with other devices controlled by the smart device 108B.

In some aspects, a time for transmitting a time-slot may be determined by the width of the time-slot and the number associated with a time-slot. For example, when the width of the time-slot is 200 ms, the time for transmitting time-slot 0 by the smart device 108B is approximately 0ms. The time for transmitting time-slot 1 by the smart device 108B is approximately 200 ms. The time for transmitting time-slot 2 by the smart device 108B is approximately 400 ms.

In some aspects, when the smart device 108A receives the control frame from the smart device 108B at time associated with time-slot 0, and the control frame is associated with time-slot 4, the time to send the uplink gateway frame may be determined by the width of the time-slot, the number associated with time-slot 0, and/or the number associated with time-slot 4, to be 200 ms×(4−0)=800 ms. When the smart device 108A receives the control frame from the smart device 108B at time associated with time-slot 1, the time to send the acknowledgement frame may be 200 ms×(4−1)=600 ms. When the smart device 108A receives the control frame from the smart device 108B at time associated with time-slot 1, the time to send the acknowledgement frame may be 200 ms×(4−2)=400 ms.

As described above, the field of "Group" may be associated with a group number. When the smart device 108A receives a control frame from the smart device 108B, the smart device 108A may determine if the group number associated with the control frame is identical to the group number associated with the smart device 108A. When it is determined that the group number associated with the control frame is not identical to the group number associated with the smart device 108A, the controlled frame may be thrown away when the field of "Msg" is not associated with a broadcast message. Otherwise, when the field of "Msg" is associated with a broadcast message, no determination may be made in association with the field of "Group".

As described above, the field of "RollingNum" may be associated with a rolling number of the control device. Each time after the smart device 108B sends a control message, the rolling number may be increased by 1 to avoid cyber-attack and improve security.

As described above, the field of "SN" may be associated with a serial number of the pairing process. The serial number may include an indication that the smart device 108B is paired with the smart device 108A. When the serial number changes, the smart device 108A may not respond to the control message from the smart device 108B.

As described above, the field of "Checksum" may be associated with a check of the device. The smart device 108B may check whether the control frame received is correct, by using the field of "Checksum". The smart device 108B may perform one or more operations if control frame is determined to be received correctly.

Figure 9:
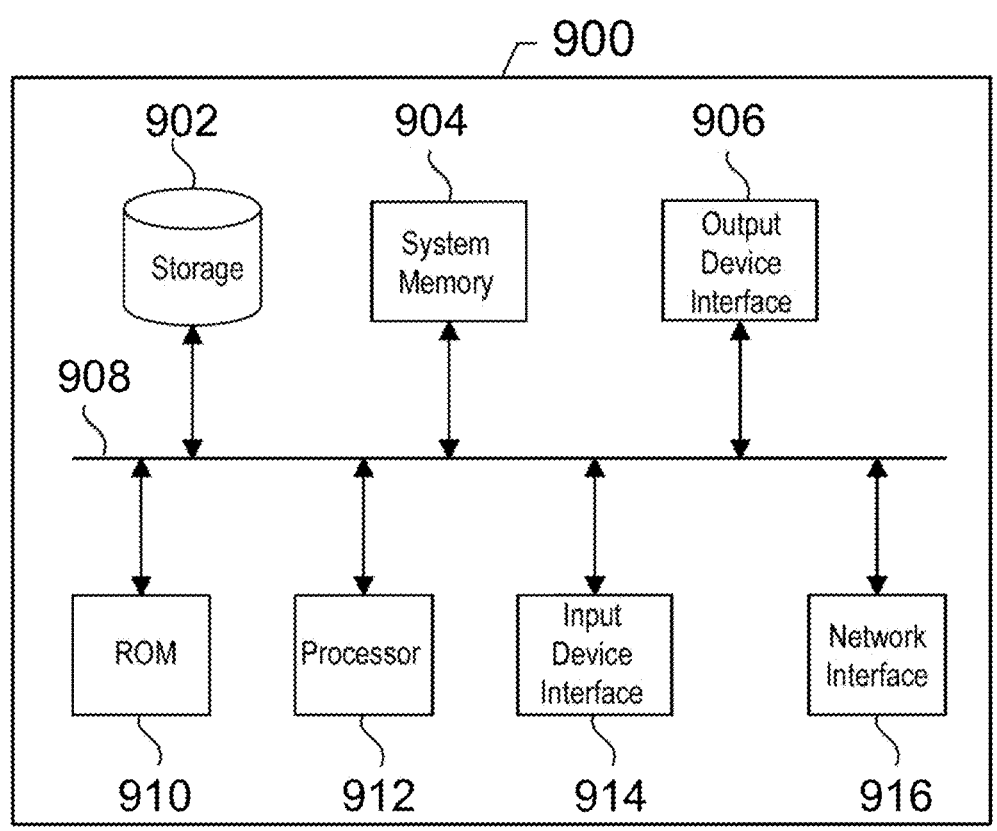
FIG. 9 conceptually illustrates an example electronic system 900 with which one or more implementations of the subject technology can be implemented.

FIG. 9 conceptually illustrates an example electronic system 900 with which one or more implementations of the subject technology can be implemented. The electronic system 900, for example, may be, or may include, one or more smart devices, such as the smart devices 108A-D, the server 110, the gateway 102, one or more electronic devices 104A-B, and/or generally any electronic device. Such an electronic system 900 includes various types of computer readable media and interfaces for various other types of computer readable media. The electronic system 900 includes a bus 908, one or more processing unit(s) 912, a system memory 904, a read-only memory (ROM) 910, a permanent storage device 902, an input device interface 914, an output device interface 906, one or more network interface(s) 916, and/or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are utilized by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random-access memory (RAM). The system memory 904 may store one or more of the instructions and/or data that the one or more processing unit(s) 912 may utilize at runtime. In one or more implementations, the processes of the subject disclosure are stored in the system memory 904, the permanent storage device 902, and/or the ROM 910. From these various memory units, the one or more processing unit(s) 912 retrieve instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by the electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 9, bus 908 also couples electronic system 900 to one or more networks (not shown) through one or more network interface(s) 916. The one or more network interface(s) may include an Ethernet interface, a Wi-Fi interface, a LoRa communication interface, a multimedia over coax alliance (MoCA) interface, a reduced gigabit media independent interface (RGMII), or generally any interface for connecting to a network. In this manner, electronic system 900 can be a part of one or more networks of computers (such as a local area network (LAN), a wide area network (WAN), or an Intranet, or a network of networks, such as the Internet. Any or all components of electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for communicating with a device, the method comprising:
    waking up from a sleep mode periodically;
    performing a first incoming transmission signal detection at a first frequency after waking up from the sleep mode;
    determining if an incoming transmission signal is detected;
    performing a second incoming transmission signal detection after the determination that no incoming transmission signal is detected in the first incoming transmission signal detection, wherein there is no time interval delay between the second incoming transmission signal detection and the first incoming transmission signal detection, wherein the performing the second incoming transmission signal detection includes determining if the incoming transmission signal is detected;
    determining if at least part of a wake message is received, based on the determination that the incoming transmission signal is detected;
    determining if the at least part of the wake message is associated with the device, based on the determination that the at least part of the wake message is received; and
    switching to a second frequency for communication, based on the determination that the at least part of the wake message is associated with the device.

2. The method of claim 1, wherein the step of determining if an incoming transmission signal is detected includes performing a channel activity detection.

3. The method of claim 1, further comprising sending a timeout signal to indicate that the no incoming transmission signal is received, based on the determination that no incoming transmission signal is received in the first incoming transmission signal detection.

4. The method of claim 3, further comprising determining if the incoming transmission signal is detected based on the determination that no incoming transmission signal is received in the second incoming transmission signal detection.

5. The method of claim 1, wherein the at least part of the wake message includes a sub-sequence in the wake message.

6. The method of claim 1, further comprising receiving a control message after switching to the second frequency for communication.

7. The method of claim 6, further comprising sending an acknowledgment message to acknowledge that the control message is received.

8. The method of claim 1, further comprising configuring to be in a sleep mode, based on the determination that the incoming transmission signal is not detected after performing the first incoming transmission signal detection and the second incoming transmission signal detection.

9. The method of claim 1, further comprising configuring to be in a sleep mode, based on the determination that the at least part of the wake message is not received.

10. The method of claim 1, further comprising configuring to be in a sleep mode, based on the determination that the at least part of the wake message is not associated with the device.

\* \* \* \* \*